United States Patent [19]

Kennedy

[11] 4,118,161
[45] Oct. 3, 1978

[54] HIGH TEMPERATURE, HIGH PRESSURE APPARATUS HAVING A DUCTILE DRIVER ELEMENT

[75] Inventor: George C. Kennedy, Los Angeles, Calif.

[73] Assignee: Kennametal Inc., Latrobe, Pa.

[21] Appl. No.: 798,767

[22] Filed: May 20, 1977

Related U.S. Application Data

[63] Continuation-in-part of Ser. No. 586,415, Jun. 12, 1975, abandoned.

[51] Int. Cl.² ............................................. B30B 11/32
[52] U.S. Cl. ..................................... 425/77; 425/352; 423/446
[58] Field of Search ............. 24/252 R; 264/313, 332; 423/446; 425/77, 405 H, DIG. 26, DIG. 35, 354, 352

[56] References Cited

U.S. PATENT DOCUMENTS

| 2,149,596 | 3/1939 | Gillett et al. | 425/DIG. 26 |
|---|---|---|---|
| 2,152,738 | 4/1939 | Jeffery | 425/405 H X |
| 2,448,277 | 8/1948 | Renier | 425/354 X |
| 2,554,499 | 5/1951 | Poulter | 425/77 |
| 3,067,465 | 12/1962 | Giardini et al. | 425/77 |
| 3,182,102 | 5/1965 | Simnad | 425/DIG. 26 |
| 3,350,743 | 11/1967 | Ishizuka | 425/77 |
| 3,365,751 | 1/1968 | Ishizuka | 425/77 |
| 3,676,069 | 7/1972 | Kennedy | 423/446 |
| 3,698,843 | 10/1972 | Bowles et al. | 425/405 H X |
| 3,727,028 | 4/1973 | Kuratomi | 425/77 X |
| 3,830,607 | 8/1974 | Baxendale | 425/405 H X |
| 3,832,100 | 8/1974 | Baxendale | 425/405 H X |
| 3,895,894 | 7/1975 | Biermann et al. | 425/77 |

Primary Examiner—J. Howard Flint, Jr.
Attorney, Agent, or Firm—Lawrence R. Burns

[57] ABSTRACT

A high pressure, high temperature, piston-cylinder type apparatus which utilizes a soft, ductile, electrically conductive material as a driver element to transmit pressure from the piston to a charge in the cylinder. The driver element, preferably made of zinc or lead, or the like is placed in the pressure cylinder between an advanceable piston and a stationary sleeve of insulating material surrounding an electrically heatable core of charge material. As the piston is advanced, the driver element deforms into the end of the sleeve of insulating material and maintains pressure on the core with minimal deformation of the sleeve of insulating material.

6 Claims, 7 Drawing Figures

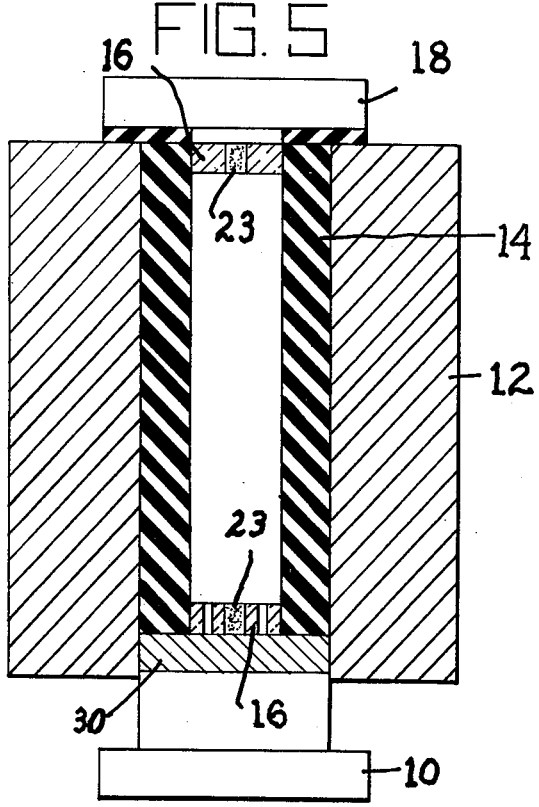
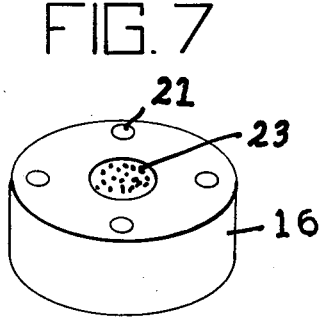
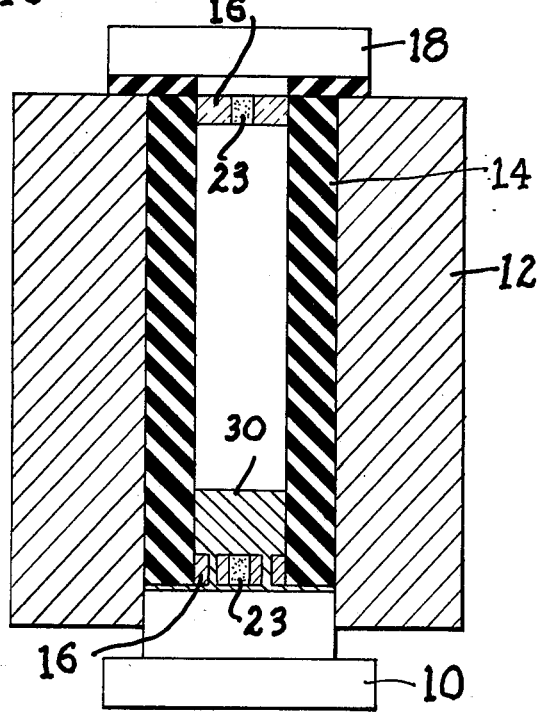

HIGH TEMPERATURE, HIGH PRESSURE APPARATUS HAVING A DUCTILE DRIVER ELEMENT

RELATED APPLICATION

This application is a continuation-in-part of U.S. Ser. No. 586,415, filed June 12, 1975, now ababandoned, entitled "HIGH TEMPERATURE, HIGH PRESSURE APPARATUS HAVING A DUCTILE DRIVER ELEMENT."

BACKGROUND OF THE INVENTION

High pressure, high temperature pistoncylinder apparatus are used for a variety of purposes and, specifically, for the production of diamond crystals. In such apparatus, a core of charge material; in the case of diamonds, graphite and a carbon solvent metal; is confined within a preferably cylindrical reaction chamber and is heated and subjected to pressure therein.

Between the cylinder and core of charge material, there is placed a surrounding sleeve of electrical insulating material, and the charge is heated by passing an electric current therethrough. The sleeve inhibits the transfer of heat outward from the core to the cylinder and surrounding apparatus and confines the heating current to the core.

The insulating material is generally cylindrical, fitting closely within the inside diameter of the cylindrical chamber and extending to near the opposite ends of the chamber. The core of charge material is usually tightly fitted within the insulation material, and may also be cylindrical in shape.

One end of the cylinder is closed and the piston fits in the open end of the cylinder and is advanceable into the cylinder in the direction toward the closed end of the cylinder. The inside diameter of the cylindrical chamber and the outside diameter of the piston that fits into the chamber usually form a snug sliding fit respectively with each other.

With the core of charge material placed in the chamber and the insulation and piston in place, electrical heating of the core of charge material takes place by passing electrical current from the closed end of the cylinder, through the core of charge material and on through the piston, thereby heating the core of charge material to any desired temperature upon command by the operator. Pressure in the cylinder is increased by advancing the piston into the cylinder at a controlled rate and with a known force exerted on the piston.

In the manufacture of diamonds, it is extremely important to know the precise temperature and pressure conditions on the core of charge material, and also to insure that the temperature and pressure conditions are maintained constant on the core of charge material. It is known in the industry that, if a core of graphite and carbon solvent are placed in the cylinder and subjected to sufficient pressure and temperature, diamond crystals will result. The size and quality of the diamond crystals can vary depending upon how well and uniformly the growth conditions of temperature and pressure are held within the chamber.

One of the problems associated with the growth of diamonds in a piston-cylinder apparatus is the problem of compensation for the volume change that takes place as a result of the conversion of carbon from graphite form to diamond form. There is a significant difference in the density of diamond and the density of graphite. The density of diamond is about 3.5 while the density of graphite is only about 2.25.

Thus, when the sufficient temperature and pressure conditions are present and the graphite begins converting into diamond, there is a corresponding reduction of volume in the core of charge material. It is desirable to maintain as constant a pressure as possible; therefore, the piston has to be advanced into the cylinder as the volume reduction is occurring.

In the prior art machines, the insulating material is located between the inside diameter of the chamber and the core of charge material. The insulating material is ideally of constant cross section throughout its length to maintain uniform current density through the charge and has uniform wall thickness such that no temperature gradients build up inside or along the core of charge material.

If the constant cross section of the insulation material is not substantially maintained during the complete cycle of the process, the relative temperature in the core will vary and "cold" or "hot" spots will build up in the core of charge materials during the reaction. This varying temperature condition will hinder the quality of diamond crystals produced.

In the prior art machines, and by the very nature of the diamond crystals forming from graphite, the piston must advance into the cylinder in order to maintain constant pressure. As the piston advances into the cylinder, it begins to crush the insulating liner. The radially outward edges of the piston contact the insulating material and begin to buckle or compress the insulation along with the core material.

When the buckling or compression of the insulating material occurs, the wall thickness of the insulating material between the core of charge material and the cylinder wall is not uniform and uniform current density is not maintained through the core of charge material. Varying temperature areas referred to as "hot" and "cold" spots now develop throughout the core of charge material and detimentally effect the controlled formation of uniform size and quality diamonds.

In the known "belt" type high pressure apparatus, the pistons taper inwardly toward the charge and the ends of the cylinder in which the charge is disposed are correspondingly tapered. Gaskets formed of deformable electrical insulating material, such as pyrophyllite, are disposed between the tapered pistons and the tapered ends of the cylinder and seal the charge in the cylinder.

The gaskets must deform to permit the piston to advance into the cylinder to compact the charge, and the tapered configuration of the pistons and cylinder ends present a substantial area which absorbs load from the pistons while limiting the amount the pistons can advance into the cylinder.

BRIEF SUMMARY OF THE INVENTION

According to the present invention, a preferably zinc or lead driver slug is placed in the chamber between the forward end of the piston and the insulation material. The material in front of the piston need not be zinc or lead, but it must be relatively soft, when compared to the insulating material, ductile and electrically conductive.

The driver slug must be so sized as to allow the piston maximum forward travel without engagement with the insulating material. In the case of diamond making, as the conversion of graphite to diamond occurs, the volume of charge shrinks and the piston must be advanced to maintain constant pressure.

At conditions of temperature and pressure, as the piston advances with the driver slug preceding the piston, the driver slug, having a low flow strength in comparison with the insulating material, deforms to fit the inside diameter of the insulating material and flows inside of the insulating material rather than forcing deformation of the insulating material. In this way, the cross section of the insulating material remains dimensionally stable around the core of charge, preventing hot or cold spots from developing in the charge.

In this way, the condition of temperature and pressure in the charge is maintained very precisely. Thus, with the pressure and electricalthermal insulation being well defined, better diamond synthesis conditions can be maintained.

The exact nature of the present invention will become more apparent upon reference to the following detailed specification taken in connection with the accompanying drawings in which:

FIG. 5 is a side view of a modification of the present invention before pressurization.

FIG. 6 is a side view of a modification of the present invention after pressurization.

FIG. 7 is a perspective of a modification of the present invention.

DETAILED DESCRIPTION OF THE INVENTION

Figure 1:
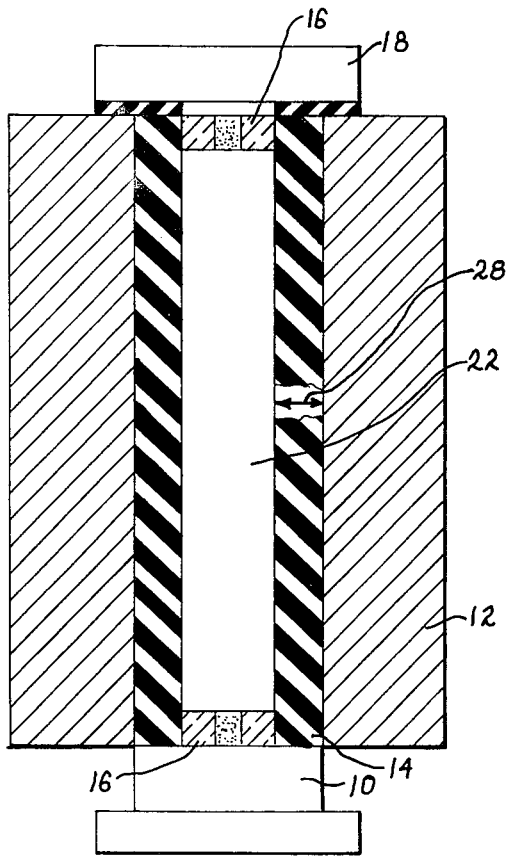
FIG. 1 is a side view of a prior art piston cylinder arrangement before pressurization.

In FIG. 1 is shown a prior art arrangement for heating and pressurizing a core of charge material 22. The core of charge material 22 is placed in cylindrical chamber 12 having an immovable or stationary piston 18 closing one end of chamber 12 and insulated therefrom by electrical insulation 14. Between the core of charge material 22 and the inside diameter of chamber 12 is placed insulation 14. Insulation 14 extends nearly the entire length of the inside diameter of cylinder 12 in a cylindrical form. Movable piston 10 just fits inside chamber 12. The outside diameter of the insulation material 14 usually has a close slip fit with the inside diameter of cylinder or chamber 12.

Graphite temperature controllers 16 facilitate electrical heating of the core of charge material 22. An electric current is passed through stationary piston 18 to the graphite temperature controller 16.

The current passes from graphite temperature controller 16 through the core of charge material 22 to the lower graphite temperature controller. The current then further passes through movable piston 10 to complete the circuit.

Movable piston 10 is aligned with the inside diameter of cylinder 12 and provides a small clearance fit with the inside diameter of the cylinder. As seen from FIG. 1, the insulating material 14 extends nearly all the way to the face of both piston 10 and 18 to prevent any excess heat loss.

Pressurization is achieved by advancing movable piston 10 into cylinder 12 toward stationary piston 18. The insulating material 14 has a uniform thickness throughout its length as shown at 28. The core of charge material is then heated to the required temperature for the diamond synthesis reaction to take place.

Figure 2:
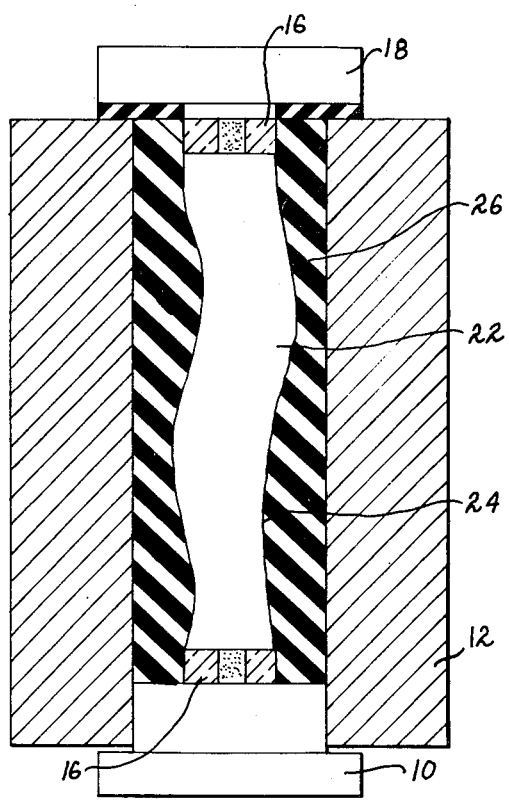
FIG. 2 is a side view of a prior art piston cylinder arrangement after pressurization.

Referring to FIG. 2, the condition of the core of charge material 22 and the insulating material 14 may be seen after the diamond synthesis reaction has taken place. Usually, when forming diamond crystals in apparatus of the type illustrated, the core of charge material will be a mixture of graphite and a carbon solvent and the insulating material would, for example, be pyrophyllite. The sequence of events that would normally take place would be pressurization of the core 22 to a sufficient pressure above the diamond graphite equilibrium line and then heating of the core of charge material 22 to a sufficient temperature to initiate the conversion of graphite to diamond.

Maintaining a constant temperature is an important factor in producing quality diamond crystals. Therefore, what is shown in FIG. 2 is the movable piston 10 advanced into cylinder 12 until a desired pressure is reached. The movement or advancement of piston 10 has initiated the deforming and buckling of insulating material 28. Once sufficient pressure is reached, the core is then heated to sufficient temperature to start the conversion of graphite to diamond, and a constant force is kept on piston 10 to maintain a steady pressure. The volume of the core of charge material, during the reaction, is being reduced because diamonds are about 56 percent more dense than graphite.

As the diamond synthesis reaction occurs, the free end of piston 10 advances further into the cylinder 12 because a constant driving force is being applied on the opposite end of piston 10. This movement further defomrs insulating material 14 such that it bulges as shown at 24 and is thinner as shown at 26. The bulging at 24 increases the current density through the core and reduces the amount of heat carried out through the walls of the chamber, causing the relative temperature in the core to become hotter in the region of 24. At the same time, the relative thinness of the insulation material at 26 decreases the current density through the core and allows more rapid heat transfer out to the walls of the chamber 12 thereby reducing the relative temperature of the core 22 in region 26. These are the regions of "hot" and "cold" spots, respectively, that the present invention avoids or minimizes.

In presses of these kinds, it is somewhat difficult to measure the overall temperature directly, so the overall temperature is usually estimated from the results of previous runs and the amount of current input into the core of charge material. If cold and hot spots develop, it becomes impossible to determine the overall temperature of the reaction in order to control the quality of the end product of diamond crystals.

Figure 3:
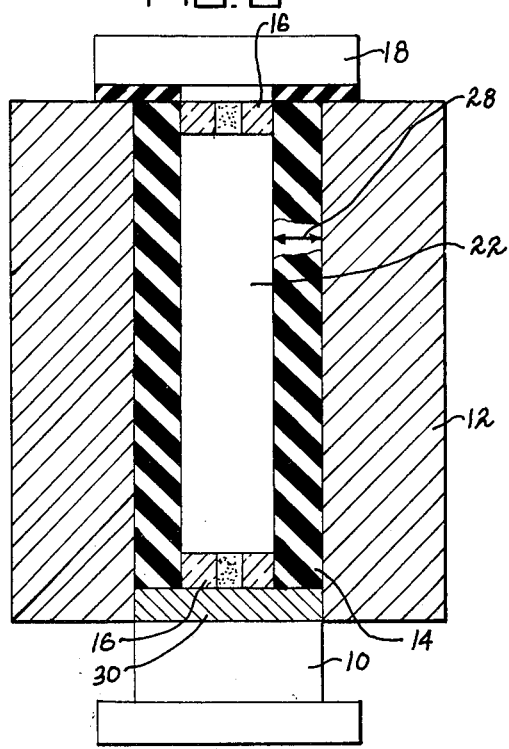
FIG. 3 is a side view of the present invention piston cylinder arrangement with driver slug before pressurization.

In FIG. 3 is shown the arrangement of the present invention before pressurization takes place. After pressurization, heating is accomplished as described previously by passing current through stationary piston 18, graphite temperature controllers 16, core of charge material 22, driver element 30 and movable piston 10. It is necessary for the driver element to be electrically conductive in order to complete the circuit required for heating the core of charge material.

Originally, the driver element 10 is in solid state and preferably has a cylindrical configuration with its diameter approximately equal to or smaller than the inside diameter of cylinder 12. An additional feature of zinc or lead and an extremely preferable feature is that the material has a very low thermal conductivity factor. Thus, it additionally helps contain heat in the core of charge material 22 rather than help dissipate the heat outward.

Then driver element in its solid state is confined between the movable piston 10 and the insulating material 14 and graphite temperature controller 16. When pressurization begins by movement of the piston 10 inward, there is no axial force exerted on the radially outward ends of insulating material 14 sufficient to deform the material. The driver element deforms around the radially inner edges of the sleeve of insulating material 14 and into the center of the sleeve. The important feature is that the driver material chosen, while it must be electrically conductive, must also have low flow strength in comparison to the flow strength of the insulating material of the sleeve.

Figure 4:
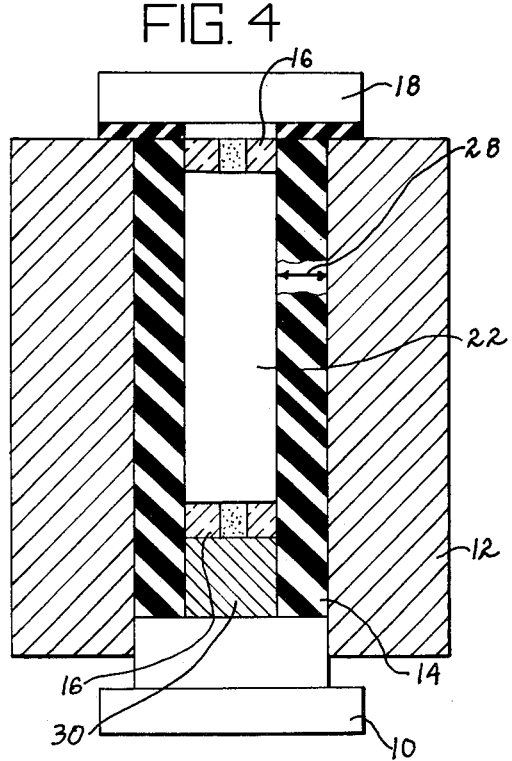
FIG. 4 is a side view of the present invention piston cylinder arrangement with driver slug after pressurization.

In FIG. 4 is shown the arrangement of the present invention after the total reaction has taken place. Movable piston 10 has moved inward into proximity with the bottom of the sleeve 14 and the driver element 30 has been deformed into the center of the sleeve 14. What is shown is the extreme position of the piston. The piston may normally not have to travel into contact or even near the bottom of the sleeve. The amount of zinc or lead to be used or required can be predetermined by one skilled in the art depending upon the dimensions of the apparatus to be used.

The main feature, however, is that the sleeve of insulating material 14 will have a nearly uniform thickness 28 throughout after the reaction instead of a buckled and pinched configuration as shown in FIG. 2, and the core of charge material will have a uniform cross sectional area throughout its length.

Further, the piston 10 can follow the shrinkage of the charge and thereby maintain constant reaction pressure on the charge for a prolonged period of time.

Referring now to FIG. 5, what is shown therein is a modification of the arrangement of the present invention. Chamber 12 has insulation material 14 contained therein and piston 10 is movable toward opposing piston 18. Driver element 30 is, of course, preferably made of zinc or lead and graphite temperature controllers 16 are shown located between the pistons 10 and 18 and the volume which will contain the core of charge material. It will be noted that the lower graphite temperature controller 16 is shown with holes 21 formed axially through a radially outer portion of graphite temperature controller 16.

FIG. 7 shows a perspective view of the graphite temperature controller 16 having through holes 21 therein.

Referring to FIG. 6, a piston cylinder arrangement is shown with the core of charge material under pressurization and having piston 10 advanced to its maximum position. Part of driver element 30 is now shown as being ahead of the graphite temperature controller 16. This has been accomplished by driver element 30 flowing through holes 21 of graphite temperature controller 16.

Further modifications may be made within the scope of the appended claims.

I claim:

1. In a high pressure, high temperature pistoncylinder apparatus which includes a chamber open at the ends and having closure means for closing the ends of said chamber with at least one said closure means comprising a piston closely slidably fitted in said chamber, a sleeve having an opening therethrough and of electrical insulating material in said chamber extending from one closure toward the other thereof and adapted to receive a core of charge material therein, and means for heating a core of charge material in said sleeve, the improvement which comprises; an electrically conductive driver element confined in the chamber between one axial radial outward end of said sleeve and the adjacent closure means, said driver element being operable in response to the application of pressure thereto by advancing movement of the piston into the chamber to deform and flow into the adjacent end of said opening of said sleeve without substantial deformation of said sleeve.

2. The improvement according to claim 1 wherein the driver element comprises a metallic substance which is electrically conductive, and has a relatively lower resistance to plastic deformation than said sleeve of insulating material.

3. The improvement according to claim 1 wherein the driver element is comprised of a lead material.

4. The improvement according to claim 1 wherein said driver element is comprised of a zinc material.

5. The improvement according to claim 1 which includes temperature controller elements located near opposing longitudinal ends of said chamber, said temperature controller elements having holes formed therein so as to allow passage of said driver element material therethrough.

6. The improvement according to claim 1 in which the axial length of said sleeve is shorter than the axial length of said chamber, and said driver element is confined in said chamber between said movable piston and said sleeve.

* * * * *